United States Patent [19]

Connell et al.

[11] Patent Number: 5,118,781
[45] Date of Patent: Jun. 2, 1992

[54] POLY(1,3,4-OXADIOZOLES) VIA AROMATIC NUCLEOPHILIC DISPLACEMENT

[75] Inventors: John W. Connell; Paul M. Hergenrother, both of Yorktown, Va.; Peter Wolf, Mogendorf, Fed. Rep. of Germany

[73] Assignee: Administrator of the National Aeronautics and Space Administration, Washington, D.C.

[21] Appl. No.: 645,089

[22] Filed: Jan. 22, 1991

[51] Int. Cl.$^5$ .................... C08G 73/08; C07D 271/10
[52] U.S. Cl. ..................................... 528/185; 548/143
[58] Field of Search ......................... 528/185; 548/143

[56] References Cited

U.S. PATENT DOCUMENTS

| | | | |
|---|---|---|---|
| 4,104,468 | 8/1978 | Valenti | 548/143 |
| 4,141,729 | 2/1979 | Okazaki et al. | 548/143 |
| 4,701,399 | 10/1987 | Nagano et al. | 548/143 |
| 5,066,811 | 11/1991 | Connell et al. | 548/119 |

Primary Examiner—John Kight, III
Assistant Examiner—Shelley A. Wright
Attorney, Agent, or Firm—George F. Helfrich

[57] ABSTRACT

Poly(1,3,4-oxadiazoles) (POX) are prepared by the aromatic nucleophilic displacement reaction of di(hydroxyphenyl)-1,3,4-oxadiazole monomers with activated aromatic dihalides or activated aromatic dinitro compounds. The polymerizations are carried out in polar aprotic solvents such as sulfolane or diphenylsulfone using alkali metal bases such as potassium carbonate at elevated temperatures under nitrogen. The di(hydroxyphenyl)-1,3,4-oxadiazole monomers are synthesized by reacting 4-hydroxybenzoic hydrazide with phenyl-4-hydrobenzoate in the melt and also by reacting aromatic dihydrazides with two moles of phenyl-4-hydroxybenzoate in the melt. This synthetic route has provided high molecular weight POX of new chemical structure, is economically and synthetically more favorable than other routes, and allows for facile chemical structure variation due to the large variety of activated aromatic dihalides which are available.

15 Claims, No Drawings

POLY(1,3,4-OXADIOZOLES) VIA AROMATIC NUCLEOPHILIC DISPLACEMENT

ORIGIN OF THE INVENTION

The invention described herein was jointly made by employees of the U.S. Government and an employee of BASF A.G., and may be manufactured and used by or for the Government for governmental purposes without the payment of any royalties thereon or therefor.

BACKGROUND OF THE INVENTION

1. Field of the Invention

The present invention relates generally to the field of poly(1,3,4-oxadiazoles) and more particularly to poly(1,3,4-oxadiazoles) created via aromatic nucleophilic displacement reaction of di(hydroxyphenyl)-1,3,4-oxadiazoles with activated aromatic dihalides and activated aromatic dinitro compounds.

2. Description of the Prior Art

Poly(1,3,4-oxadiazoles) (POX) are heterocyclic polymers which were first synthesized by the reaction of bistetrazoles and diacid chlorides. [C. J. Abshire and C. S. Marvel, *Makromolecular Chemistry*, 44/46, 388 (1961)]. Since then several different reaction pathways have been developed to prepare these polymers. The most popular synthesis involves the preparation of a precursor polyhydrazide by the reaction of a diacid chloride or derivative with hydrazine or a dihydrazine compound. This precursor polyhydrazide is cyclized to the POX by heating to 200°-300° C. under vacuum or heating in a high boiling dehydrating solvent such as sulfuric or polyphosphoric acid. [A. H. Frazer and F. T. Wallenberger, *Journal of Polymer Science*, A-2, 1137, 1147, 1157 (1964)]. A different synthetic procedure produces POX in one step by the solution polymerization of a dicarboxylic acid or the corresponding nitrile, amide, or ester with hydrazine or its salt in polyphosphoric or sulfuric acid. [Y. Iwakura, K. Uno and S. Hara, A3, 45 *Journal of Polymer Science* (1965)]. Another method involves the self-polymerizing reaction of a dihydrazide in polyphosphoric or sulfuric acid. [Y. Iwakura, K. Uno and S. Hara, *Makromol. Chem.*, 94, 103 (1966)]. The final preparation of POX is accomplished through the cyclodeammonation reaction of poly(N-acylhydrazidines), also referred to as poly(N-acylamidrazones), by heating in strong acids such as refluxing trifluoroacetic acid or polyphosphoric acid at 200° C. [P. M. Hergenrother, *Macromolecules*, 3(1), 10 (1970); see also M. Saga and T. Shono, *Journal of Polymer Science*, B-4, 869 (1966)]. For a general review of poly(1,3,4-oxadiazoles) see "Thermally Stable Polymers" by P. E. Cassidy, Marcel Dekker, Inc. New York, p. 179; see also P. E. Cassidy and N. C. Fawcett, *Journal of Macromolecular Science Reviews*, C17(2), 209 (1979).

SUMMARY OF THE INVENTION

The primary object of this invention constitutes new compositions of matter and a new process to prepare poly(1,3,4-oxadiazoles). It concerns new POX, novel monomers, and the process for preparing the same.

Another object of the present invention is to provide new POX that are useful as adhesives, coatings, films, membranes, moldings, and composite matrices.

Another object of the present invention is the composition of several new di(hydroxyphenyl)-1,3,4-oxadiazole monomers.

According to the present invention, the foregoing and additional objects were obtained by synthesizing POX by the nucleophilic displacement reaction of di(-hydroxyphenyl)-1,3,4-oxadiazole monomers with activated aromatic dihalides. The inherent viscosities ($\eta_{inh}$) of the POX ranged from 1.02 to 1.71 dL/g and the glass transition temperatures ($T_g$) ranged from 182° to 242° C. Several of the polymers exhibited crystalline melting temperatures ($T_m$) by differential scanning calorimity (DSC) and wide angle X-ray diffraction. The $T_m$s ranged from 265° to 390° C. Thermogravimetric analysis showed no weight loss occurring below 300° C. in air or nitrogen with a 5% weight loss occurring at approximately 500° C. in air and nitrogen.

The synthesis of the POX involved the use of di(hydroxyphenyl)-1,3,4-oxadiazoles of two different types. The first type was prepared from 4-hydroxybenzoic hydrazide and phenyl-4-hydroxybenzoate (see equation 1). The second type of di(hydroxyphenyl)-1,3,4-oxadiazole was prepared by reacting two moles of 4-hydroxybenzoic hydrazide with an aromatic diacid chloride (see equation 2). The substitution of the hydroxy groups in either type of monomer may be meta-meta, para-para, or para-meta. The general reaction sequence for the synthesis of POX is represented in equations (3) and (4).

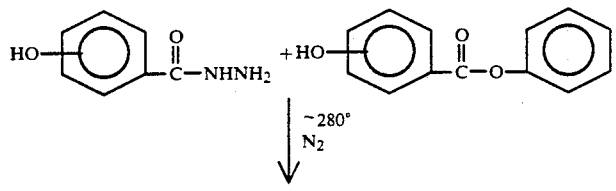

(Equation 1)

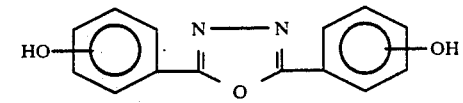

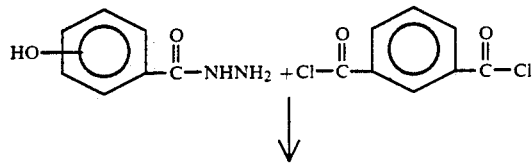

(Equation 2)

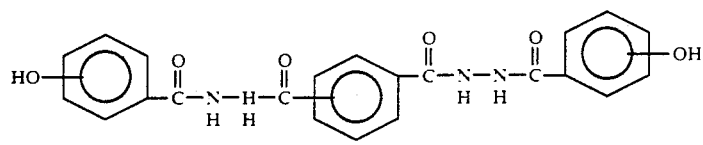

(Intermediate dihydrazide)

~290° C.

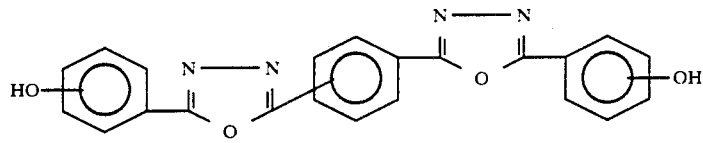

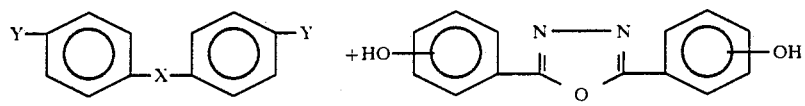

(Equation 3)

aprotic solvent
$N_2$ | alkali metal base
heat

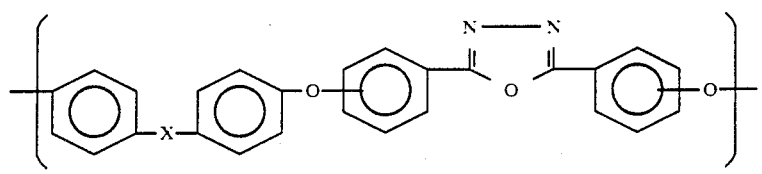

(Equation 4)

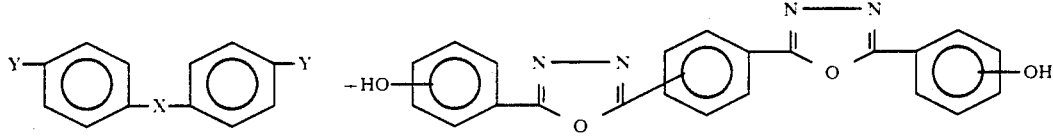

aprotic solvent
$N_2$ | alkali metal base
heat

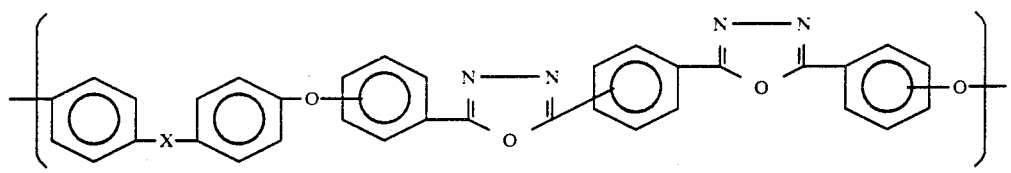

DESCRIPTION OF THE PREFERRED EMBODIMENTS

The present invention comprehends synthesizing POX via aromatic nucleophilic displacement reaction of novel di(hydroxyphenyl)-1,3,4-oxadiazoles of two types with activated aromatic dihalides or activated aromatic dinitro compounds. The general reaction sequence is represented in equation (5).

(Equation 5)

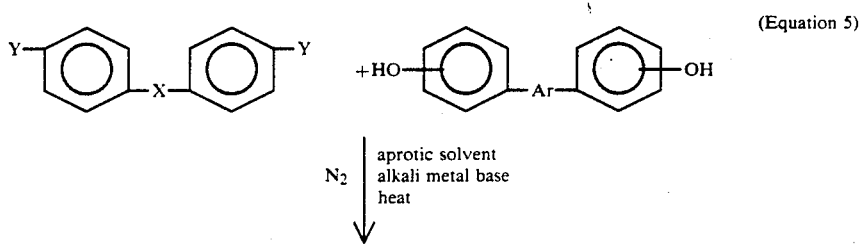

aprotic solvent
$N_2$ | alkali metal base
heat

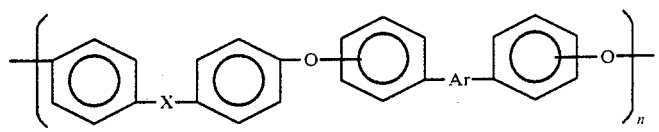

Y is a chloro, fluoro, or nitro group. X is a radical selected from the group consisting of:

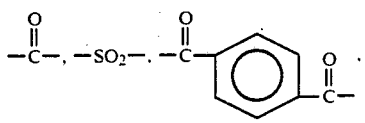

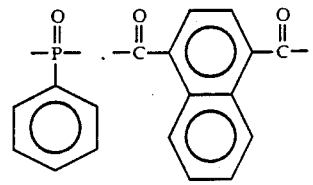

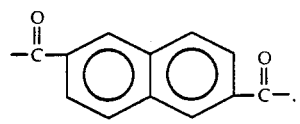

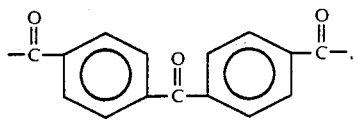

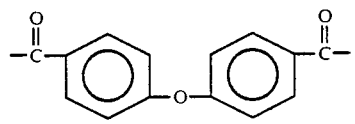

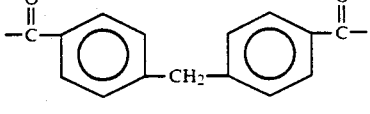

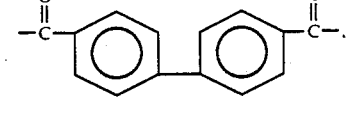

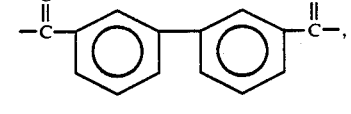

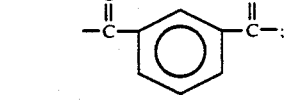

wherein Ar is selected from the group consisting of:

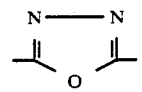

and

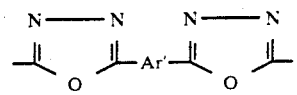

where Ar' is selected from the group consisting of:

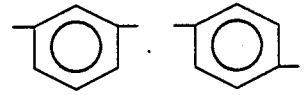

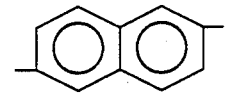

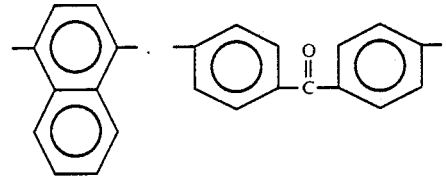

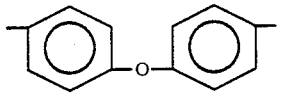

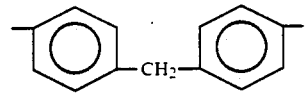

and where n is an integer between 4 and 100. Substitution of the hydroxy radicals may be meta-meta, para-para, or para-meta. The reaction is carried out in a polar aprotic solvent selected from the group consisting of N,N-dimethylacetamide, N-methylpyrrolidone, sulfolane, diphenylsulfone, N-cyclohexylpyrrolidone, and dimethylsulfoxide, using an alkali metal base such as $K_2CO_3$, $Na_2CO_3$, KOH, and NaOH. The reaction is then carried out with the application of heat under nitrogen.

The first type of novel di(hydroxyphenyl)-1,3,4-oxadiazole monomer was prepared by reacting 4-hydroxybenzoic hydrazide and phenyl-4-hydroxy benzoate. The reaction is given by equation (1) above. The reaction is carried out with the application of heat under nitrogen.

The second type of novel di(hydroxyphenyl)-1,3,4-oxadiazole monomer was prepared by reacting two moles of 4-hydroxybenzoic hydrazide with an aromatic diacid chloride. The general reaction mechanism is given by equation (2). This reaction is carried out at approximately 0° C. The resulting product from the reaction is an intermediate dihydrazide which is collected and then placed in a vacuum oven and heated to a high temperature to achieve cyclodehydration to the oxadiazole.

Having generally described the invention, a more complete understanding thereof may be obtained by reference to the following examples which are provided herein for purposes of illustration only and do not limit the invention.

EXAMPLES

Example I

The following example illustrates the reaction sequence shown in equation 1 above for the preparation of the monomer and the reaction sequence shown in equation 3 above for the preparation of the polymer, where X is equal to a sulfone group and Y is Cl.

Monomer Synthesis

2,5-Bis(4-hydroxyphenyl)-1,3,4-Oxadiazole

Into a 250 ml three neck round bottom flask equipped with a magnetic stirbar, nitrogen inlet, glass stopper and distillation head is placed 4-hydroxybenzoic hydrazide (60.9 g, 0.4 mol) and phenyl-4-hydroxybenzoate (85.7 g, 0.4 mol). The mixture is heated to approximately 210° C. by use of a Wood's metal bath. The solids melt and phenol begins to evolve and is removed via the distillation head. The melt begins to solidify after about 15-20 minutes. The temperature is then increased to 300° C. and held for approximately one hour while under nitrogen. After cooling, the tan solid is pulverized and stirred with methanol (150-200 ml). The undissolved solid is collected and dried at 150° C. in a forced air oven. The white solid (approximately 56 g) is recrystallized from N,N-dimethylacetamide (DMAc, 225 ml) and water (105 ml) and after drying at 200° C. under vacuum (45.7 g, 45% yield), it exhibited a melting point of 347° C. by differential thermal analysis (DTA). [Y. Iwakura, U. Keikichi, Y. Imai, and Y. Takase, *Die Makromoleculare Chemie*, 95, 261 (1966) melting point 338° C.]. Elemental analysis for $C_{14}H_{10}O_3N_2$. Calculated: C, 66.13%; H, 3.96%; O, 18.88%; N, 11.02%. Found C, 66.17%; H, 4.05%; N, 11.12%.

Poly(1,3,4-oxadiazole) Synthesis

Into a 100 ml three neck round bottom flask equipped with a mechanical stirbar, thermometer, $N_2$ inlet an reflux condenser is placed 2,5-bis(4-hydroxyphenyl)-1,3,4-oxadiazole (2.5424 g, 0.01 mol), diphenylsulfone (20 g, 19% solids) and pulverized anhydrous potassium carbonate (3.2 g, 0.023 mol, 15% excess). The mixture is heated to approximately 180° C. under nitrogen. After about 20 minutes at this temperature 4,4'-dichlorodiphenylsulfone (2.8716 g, 0.01 mol) is added. The temperature is increased to about 210° C. for 16 hours under nitrogen. The viscous reaction mixture is diluted with N-methylpyrrolidone (NMP, 20 ml) at 200° C. and precipitated into methanol/acetic acid mixture in a high speed blender. The polymer is collected, washed successively with hot methanol, hot water and hot methanol and dried at 120° C. for 16 hours in a forced air oven. The polymer[yield 4.5 g (96%)] exhibited a glass transition temperature of 226° C. and an inherent viscosity (0.5% solution in m-cresol solution at 25° C.) of 1.02 dL/g. Thin films cast from m-cresol solution gave tensile strength, tensile modulus and elongation at 25° C. of 11.6 Ksi, 304.2 Ksi and 7.5% and at 150° C. of 7.7 Ksi, 274.0 Ksi and 4.3% respectively.

Example II

The following example illustrates the reaction sequence for the preparation of the POX as shown in equation 3 above where X equals an isophthaloyl group and Y equals F.

Into a 100 ml three neck round bottom flask equipped with a mechanical stirrer, thermometer, $N_2$ inlet, and reflux condenser is placed 2,5-bis(4-hydroxyphenyl)-1,3,4-oxadiazole (2.5424 g, 0.01 mol), diphenylsulfone (23 g, 19% solids), and pulverized anhydrous potassium carbonate (3.2 g, 0.023 mol, 15% excess). The mixture is heated to approximately 180° C. under nitrogen. After about 20 minutes at this temperature 1,3-bis(4-fluorobenzoyl)benzene (3.2230 g, 0.01 mol) is added. The temperature is increased to approximately 210° C. for 16 hours under nitrogen. The viscous reaction mixture is diluted with NMP (20 ml) at 200° C. and precipitated into methanol/acetic acid mixture in a high speed blender. The polymer is washed successively with hot methanol, hot water, and hot methanol and dried at 120° C. for 16 hours in a forced air oven. The polymer [yield 5.25 g (98%)] exhibited a glass transition temperature of 182° C. and a melting transition temperature of 265°. The inherent viscosity (0.5% solution in m-cresol at 25° C.) was 1.53 dL/g. Thin films cast from m-cresol solution gave tensile strength, tensile modulus and elongation at 25° C. of 15.0 Ksi, 414.3 Ksi, and 4.3% and at 150° C. of 7.4 Ksi and 10.7% respectively.

Example III

The following example illustrates the reaction sequence for the preparation of the monomer (1,3-isomer) as shown in equation 2 and for the preparation of the POX as shown in equation 4 above where X is an isophthaloyl group and y equals F.

Monomer Sythesis

2,2'-(1,3-Phenylene)bis[5-(4-hydroxyphenyl)-1,3,4-oxadiazole]

Into a 250 ml three neck round bottom flask equipped with a magnetic stirbar, thermometer, addition funnel, and glass stopper is placed 4-hydroxybenzoic hydrazide (6.0 g, 0.039 mol) and dry DMAc (90 ml). After the solid dissolves the solution is cooled to approximately 0° C. via an ice water bath. A solution of isophthaloyl chloride (4.0 g, 0.0195 mol) in dry DMAc (30 ml) is placed in the addition funnel. The isophthaloyl chloride solution is added dropwise over approximately one hour while maintaining the reaction temperature between 0° and 5° C. After the entire solution has been added, the ice bath is removed and the solution is allowed to warm to room temperature, stirring is continued for 16 hours. The DMAc solution is poured into ice/water to give a white precipitate which is collected by filtration and subsequently dried at 70° C. under vacuum. Yield 7.1 g (76%) of the intermediate dihydrazide, m.p. 298° C. (DTA). The intermediate dihydrazide (6.0 g) is placed in a vacuum oven and heated to 280° C. for approximately 4 hours to achieve cyclodehydration to the oxadiazole. The solid is pulverized and washed in hot ethanol to yield a yellow solid (4.3 g, 85%) m.p. greater than 400° C. The solid is used without further purification.

(98%)] exhibited a glass transition temperature of 200° C. The inherent viscosity (0.5% solution in concentrated sulfuric acid at 25° C.) was 0.36 dL/g.

Polymer characterization data and thin film properties of particular polymers are set forth in the following Tables 1 and 2.

TABLE 1
POLYMER CHARACTERIZATION

| POLYMER | X | $\eta_{inh}$, dL/g | $T_g$, °C. | $T_m$, °C. |
|---|---|---|---|---|
| P1 | (phenylphosphine oxide) | 1.38 | 242 | — |
| P2 | —SO$_2$— | 1.02 | 226 | — |
| P3 | —C(=O)— | 1.57 | 205 | 325 |
| P4 | —C(=O)—C$_6$H$_4$—C(=O)— (para) | 1.71 | 201 | 390 |
| P5 | —C(=O)—C$_6$H$_4$—C(=O)— (meta) | 1.53 | 182 | 265 |

TABLE 2
THIN FILM PROPERTIES

| POLYMER | TEST TEMP., °C. | TENSILE STRENGTH, KSI | TENSILE MODULUS, KSI | ELONG., % |
|---|---|---|---|---|
| P1 | 23 | 11.1 | 334.2 | 7.1 |
|    | 150 | 7.9 | 301.9 | 3.6 |
| P2 | 23 | 11.6 | 304.2 | 7.5 |
|    | 150 | 7.7 | 274.0 | 4.3 |
| P5 | 23 | 15.0 | 414.3 | 4.3 |
|    | 150 | 7.4 | 365.2 | 10.7 |

Polymer Synthesis

Into a 100 ml three neck round bottom flask equipped with a mechanical stirbar, thermometer, N$_2$ inlet, and reflux condenser is placed 2,2'-(1,3-phenylene)bis[5-(4-hydroxyphenyl)-1,3,4-oxadiazole] (3.9836 g, 0.01 mol), diphenylsulfone (28 g, 19% solids) and pulverized anhydrous potassium carbonate (3.2 g, 0.023 mol, 15% excess). The mixture is heated to approximately 180° C. under nitrogen. After about 20 minutes at this temperature, 1,3-bis(4-flourobenzoyl)benzene (3.2231 g, 0.01 mol) is added. The temperature is increased to 210°–220° C. and the mixture is stirred for 16 hours under nitrogen. The viscous reaction mixture is diluted with NMP (30 ml) at 200° C. and precipitated into methanol/acetic acid mixture in a high speed blender. The polymer is washed successively with hot methanol, hot water, and hot methanol and dried at about 120° C. for 16 hours in a forced air oven. The polymer [yield 6.7 g

What is claimed is:

1. A poly(1,3,4-oxadiazole) consisting of repeating units having the following general structural formula

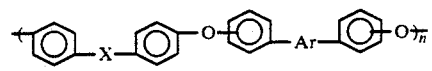

wherein the substitution of oxygen is selected from the group consisting of meta-meta, para-para, and para-meta; wherein Ar is a radical selected from the group consisting of:

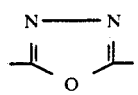

A.

-continued
and
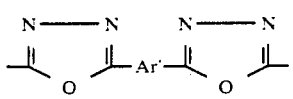 B.
wherein Ar' is selected from the group consisting of:
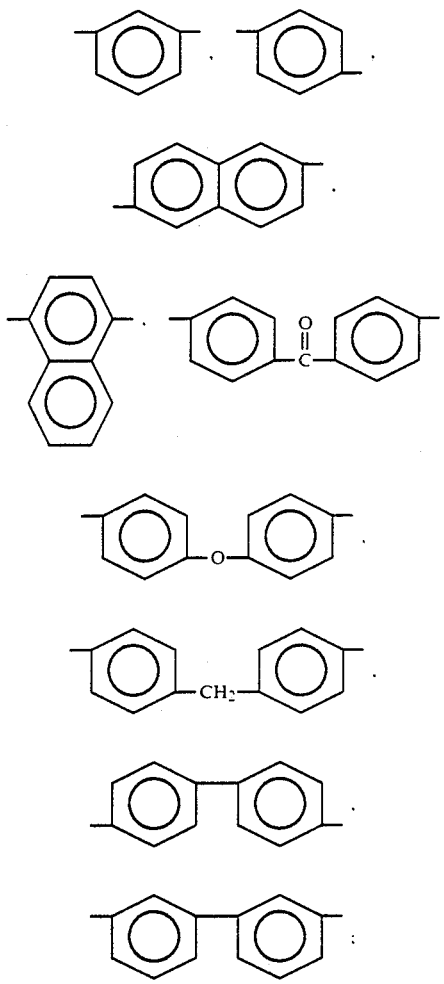
wherein X is a radical selected from the group consisting of:
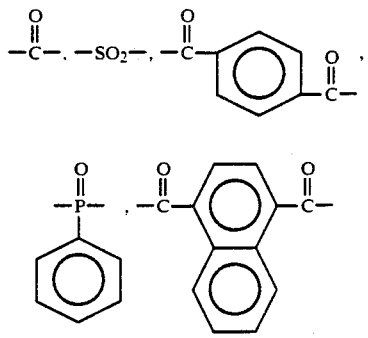
-continued
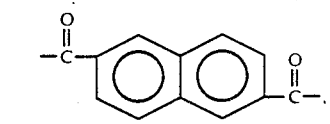
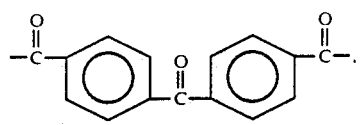
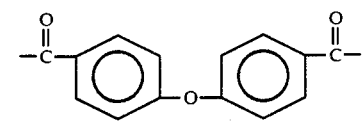
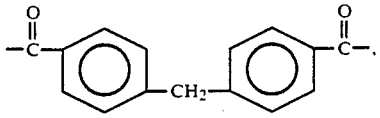
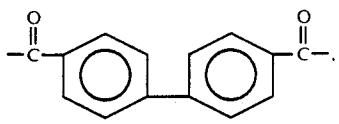
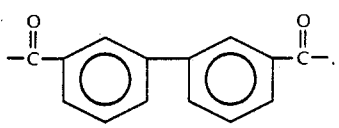
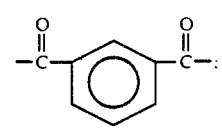
and wherein n is an integer between 4 and 100.
2. The poly(1,3,4-oxadiazole) of claim 1 wherein Ar is a radical represented by
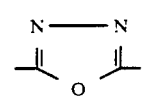
and X is selected from the group consisting of:
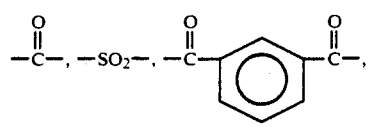
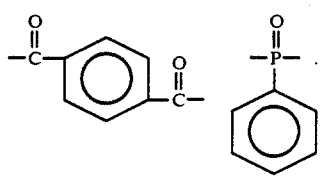
3. The poly(1,3,4-oxadiazole) of claim 1 wherein Ar is a radical represented by

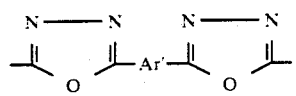

wherein Ar' is 1,3-phenylene.

4. The poly(1,3,4-oxadiazole) of claim 3 where X is isophthaloyl.

5. A di(hydroxyphenyl)-1,3,4-oxadiazole having the general structure

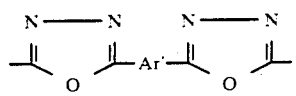

wherein the substitution of the hydroxy radicals is selected from the group consisting of meta-meta, para-para, and para-meta; where Ar is:

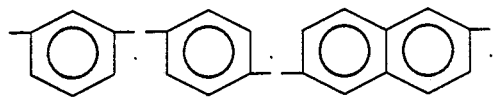

and wherein Ar' is selected from the group consisting of:

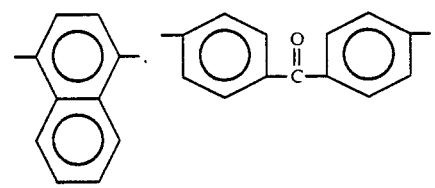

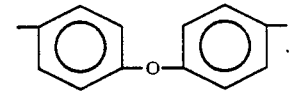

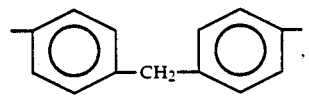

6. The di(hydroxyphenyl)-1,3,4-oxadiazole of claim 5 where Ar' is 1,3-phenylene.

7. A process for synthesizing poly(1,3,4-oxadiazoles) by aromatic nucleophilic displacement, which comprises reacting a di(hydroxyphenyl)-1,3,4-oxadiazole having the general structural formula

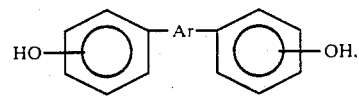

wherein the substitution of the hydroxy radicals is selected from the group consisting of meta-meta, para-para, and para-meta; wherein Ar is selected from the group consisting of:

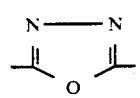

A.

and

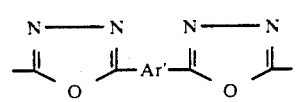

B.

and wherein Ar' is selected from the group consisting of:

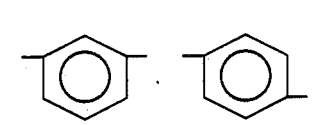

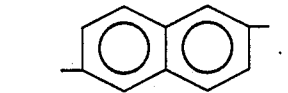

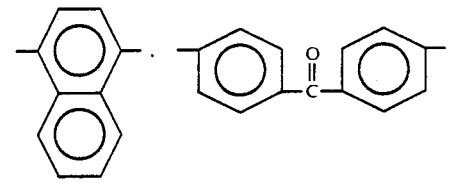

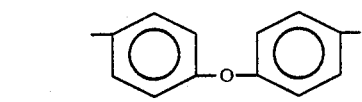

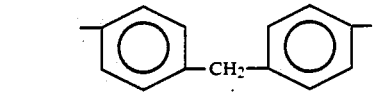

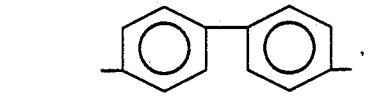

with an activated aromatic dihalide or dinitro compound having the general structure

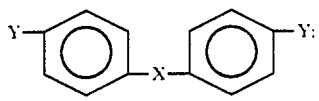

wherein X is a radical selected from the group consisting of:

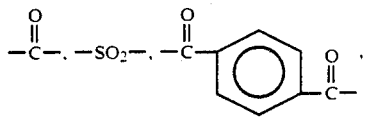

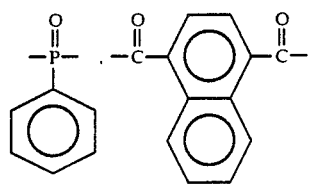

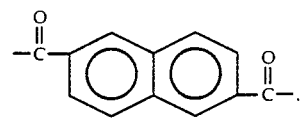

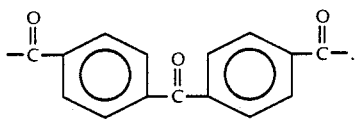

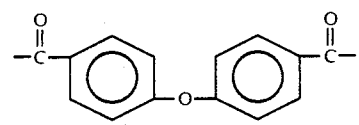

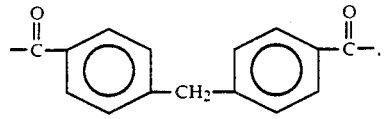

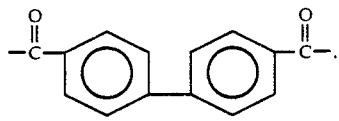

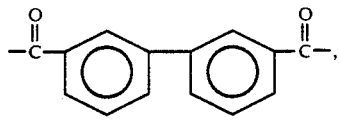

-continued

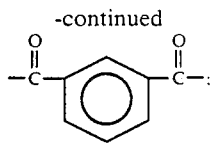

wherein y is selected from the group consisting of: Cl, F, and NO₂; and wherein the reaction is carried out in a polar aprotic solvent selected from the group consisting of N,N-dimethylacetamide, N-methylpyrrolidone, sulfolane, diphenylsulfone, N-cyclohexylpyrrolidone, and dimethylsulfoxide; wherein the reaction is carried out in the presence of an alkali metal base selected from the group consisting of K₂CO₃, Na₂CO₃, KOH, and NaOH; and wherein the reaction is carried out with the application of heat.

8. The method of claim 7 wherein X is selected from the group consisting of:

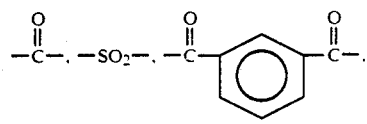

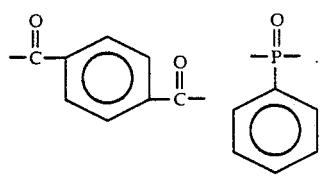

9. The method of claim 7 wherein Ar is

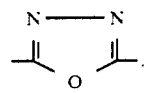

10. The method of claim 7 wherein Ar is

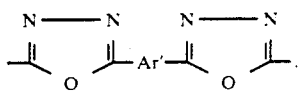

11. The method of claim 10 wherein Ar' is 1,3-phenylene.

12. The method of claim 10 wherein Ar' is 1,3-phenylene and X is isophthaloyl.

13. The method of claim 7 wherein Y is selected from the group consisting of F and Cl.

14. The method of claim 7 wherein Y is F.

15. The method of claim 7 wherein the solvent is diphenylsulfone.

* * * * *